Oct. 20, 1931.  J. C. MORRELL ET AL  1,827,899
HYDROCARBON OIL CONVERSION
Filed Jan. 6, 1928
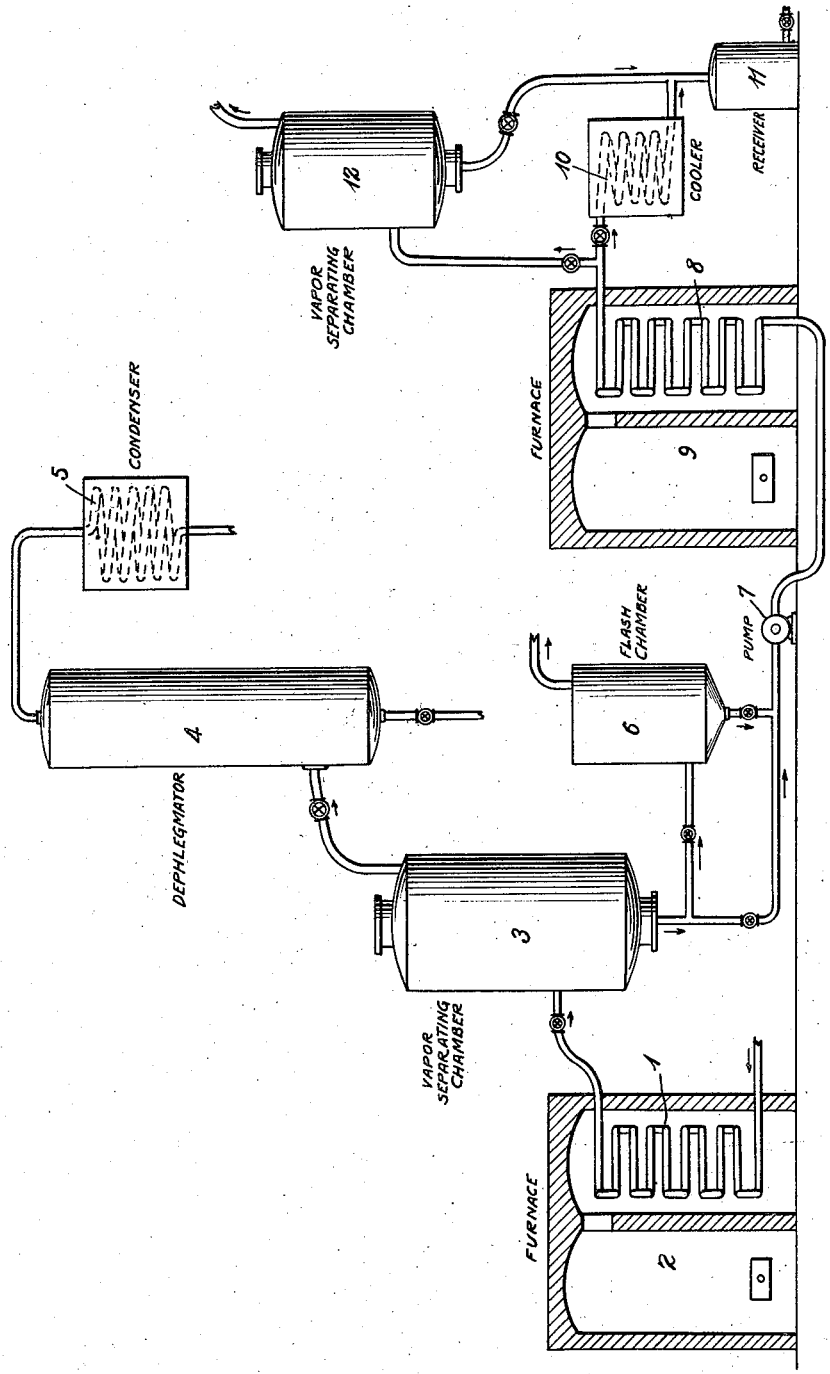
Inventors
Jacque C. Morrell
and Warren F. Faragher
By Frank L. Belknap
Attorney Patented Oct. 20, 1931

1,827,899

UNITED STATES PATENT OFFICE

JACQUE C. MORRELL AND WARREN F. FARAGHER, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

HYDROCARBON OIL CONVERSION

Application filed January 6, 1928. Serial No. 245,040.

This invention relates more particularly to the treatment of liquid or semi-liquid residue produced following the conversion of hydrocarbon oil which has been subjected to cracking conditions of heat and super-atmospheric pressure.

The essence of the present invention resides in subjecting said residue to a treatment for the purpose of increasing its fluidity and, as an incident to this treatment, removing from said residue relatively small yields of desirable light products contained therein or made therefrom.

In the commercial cracking of hydrocarbon oil under heat and super-atmospheric pressure, there is produced maximum yields of desirable light hydrocarbons, for instance, those of the gasoline-like type, one of the by-products of such conversion comprising liquid or semi-liquid residue. This residue comprises the non-vaporous residual products of reaction which is withdrawn from the process, cooled, and used in many instances as fuel oil. In some of the commercial cracking processes in wide use today, the residue produced is highly viscous and is not as desirable for use as fuel as a residue which has a lower viscosity. It is of the utmost importance that substantially all of the liquid or semi-liquid residue produced in the cracking of hydrocarbon oils be utilized in a commercial way, and the present invention has for its principal object the subjection of such liquid or semi-liquid residue to a treatment for the purpose of decreasing its viscosity or increasing its fluidity for the purpose of commercial use.

It is a further object of the invention to provide a process of the character described wherein relatively small yields of desirable light hydrocarbons may be produced during the step of increasing the fluidity of the residue.

One of the most widely used cracking processes of the present day utilizes a structure of the tube and tank type wherein the hydrocarbon oil to be converted is subjected to heat while passing through a lengthy tubular passageway mounted in a furnace and is then discharged into an enlarged chamber wherein separation of vaporous from non-vaporous fractions takes place. The conditions of operation may be so controlled as to produce maximum conversion, the liquid or semi-liquid residue withdrawn from said enlarged drum, being cooled and utilized as fuel.

In a modification of this type of operation, the separation of vaporous from non-vaporous constituents is so controlled as to produce only a relatively small yield of vaporous products and a relatively large yield of non-vaporous products in the initial tube and tank. The non-vaporous products are removed from said tank and discharged into a second tank while simultaneously the pressure is substantially reduced or released altogether, thus causing the temperature to be decreased, resulting in a release of a large yield of vaporous fractions due to the sensible heat retained in said residue.

The present invention, in its broad aspect, contemplates the treatment of the liquid or semi-liquid residue from both of these types of operation, and in its preferred embodiment is particularly adapted to the treatment of the residue produced during the latter or so-called flashing operation.

In the preferred mode of carrying out the present invention, this liquid or semi-liquid residue is removed from the cracking process and, without intentionally decreasing the temperature thereof, which may be from 500° to 600° F., subjected to recracking or reconversion by subjecting same to heat, preferably under super-atmospheric pressure. This recracking or reconversion may take place while said residue is being passed through a continuous elongated passageway of restricted cross-section, which may take the form of the conventional coil. Said residue may be withdrawn from said coil and immediately subjected to a cooling action, or, preferably, may be discharged into an evaporator where any lighter fractions produced as a result of such reconversion or recracking may be released and separately collected.

It is to be noted that the primary object of subjecting said residue to a reconversion or recracking action is to increase its fluidity, and the formation of lighter gravity reaction products is preferably only incidental to the atttainment of this primary object. The attainment of this primary object is accomplished by controlling the temperature and pressure conditions to which said residue is subjected during the recracking action. As an illustration merely, which is not to be construed in any way as a limitation, said rseidue while passing through said coil may be subjected to a temperature of 800° to 875° F., more or less, under a super-atmospheric pressure of 100 to 200 pounds, more or less. It is to be understood, of course, that this pressure may vary from three to several hundred pounds, and that the temperature may vary 100° above or below those temperatures set forth in the illustration. The proper temperature and pressure to be used for the attainment of the object of the present invention will depend upon the character of the residue being treated and the extent to which it is necessary to increase its fluidity. The most desirable conditions will be within the purview of those skilled in this art.

It is to be noted that the residue, after being subjected to the reconversion described above, is cooled and collected separately, being a product which is saleable for use as a good fuel oil.

We are aware that heretofore it has been proposed to subject liquid or semi-liquid residue produced in the cracking of hydrocarbon oils to a reconversion or recracking action for the purpose of increasing the over-all yield of desirable light products from a given raw material. In such processes the residue subsequent to being subjected to the reconversion action is combined again with the residue in one of the drums mentioned above. The distinction between the present invention and this prior art will be obvious.

The present invention will be found to be desirable particularly when dealing with paraffin base oils.

The accompanying drawing is a schematic representation of our process. The cracking system comprises a heating coil 1, disposed in furnace 2, a reaction or vapor separating chamber 3, a dephlegmator 4, and a final condenser 5. There may also be provided a flash chamber 6 for distilling the cracked residue separated in chamber 3 by pressure reduction, if the flashing type of cracking process is being carried out. The cracked residue from separating chamber 3 or from flash chamber 6 is forced by pump 7 through heating coil 8 disposed in furnace 9 and is subjected in the coil to the temperature and pressure conditions hereinbefore set forth. The treated residue is then cooled in cooler 10 and collected in receiver 11. Instead of being cooled in cooler 10, the heated residue may be discharged into a vapor separating chamber 12 for the separation of any lighter fractions produced in heating coil 8, the unvaporized residue being then collected in receiver 11.

We claim as our invention:

The improvement in the residue disposal of oil cracking processes, which consists in reducing the pressure on the hot residue to permit flash distillation thereof, and increasing the fluidity of the remaining residuum by passing it without material positive cooling to a heating zone wherein it is raised to a cracking temperature under superatmospheric pressure.

JACQUE C. MORRELL.
WARREN F. FARAGHER.